(12) United States Patent
Noguchi

(10) Patent No.: US 10,070,061 B2
(45) Date of Patent: Sep. 4, 2018

(54) IMAGE CAPTURING APPARATUS FOR ADDRESSING IMAGE BLUR AND CONTROL METHOD FOR THE SAME

(71) Applicant: CANON KABUSHIKI KAISHA, Tokyo (JP)

(72) Inventor: Masaaki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/063,352

(22) Filed: Mar. 7, 2016

(65) Prior Publication Data
US 2016/0269641 A1  Sep. 15, 2016

(30) Foreign Application Priority Data
Mar. 9, 2015 (JP) .................................. 2015-046426

(51) Int. Cl.
H04N 5/228 (2006.01)
H04N 5/232 (2006.01)
H04N 5/357 (2011.01)

(52) U.S. Cl.
CPC ..... H04N 5/23267 (2013.01); H04N 5/23258 (2013.01); H04N 5/23287 (2013.01); H04N 5/3572 (2013.01)

(58) Field of Classification Search
CPC .................................................. H04N 5/23267
USPC .................................................... 348/208.11
See application file for complete search history.

(56) References Cited

U.S. PATENT DOCUMENTS

| 6,332,060 | B1* | 12/2001 | Miyamoto | ............... G03B 5/00 396/55 |
| 2008/0136924 | A1* | 6/2008 | Washisu | ............... G02B 27/646 348/208.2 |
| 2009/0309985 | A1* | 12/2009 | Ibi | ...................... H04N 5/23248 348/208.4 |
| 2011/0157380 | A1* | 6/2011 | Yamazaki | .......... H04N 5/23248 348/208.4 |

FOREIGN PATENT DOCUMENTS

JP   2013-104921 A   5/2013

* cited by examiner

*Primary Examiner* — Usman Khan
(74) *Attorney, Agent, or Firm* — Canon U.S.A., Inc. IP Division

(57) ABSTRACT

A range of movement of a correction unit is set based on an object distance value. According to various embodiments, the range of movement of the correction unit is set to be larger as the object distance increases. According to one embodiment, a setting unit sets the range of movement of the correction unit to be larger as the object distance increases in a range where an object distance is larger than a first threshold and is equal to or smaller than a second threshold, and the setting unit fixes the range of movement of the correction unit to be a first range of movement where the object distance is equal to or smaller than the first threshold, and to be a second range of movement where the object distance is larger than the second threshold.

8 Claims, 6 Drawing Sheets

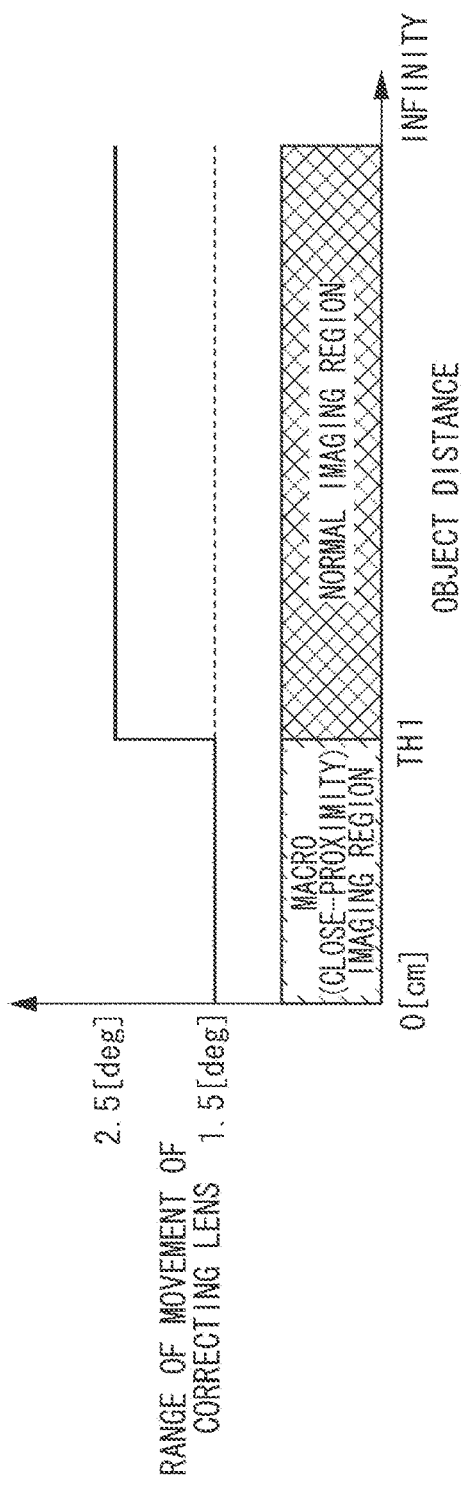
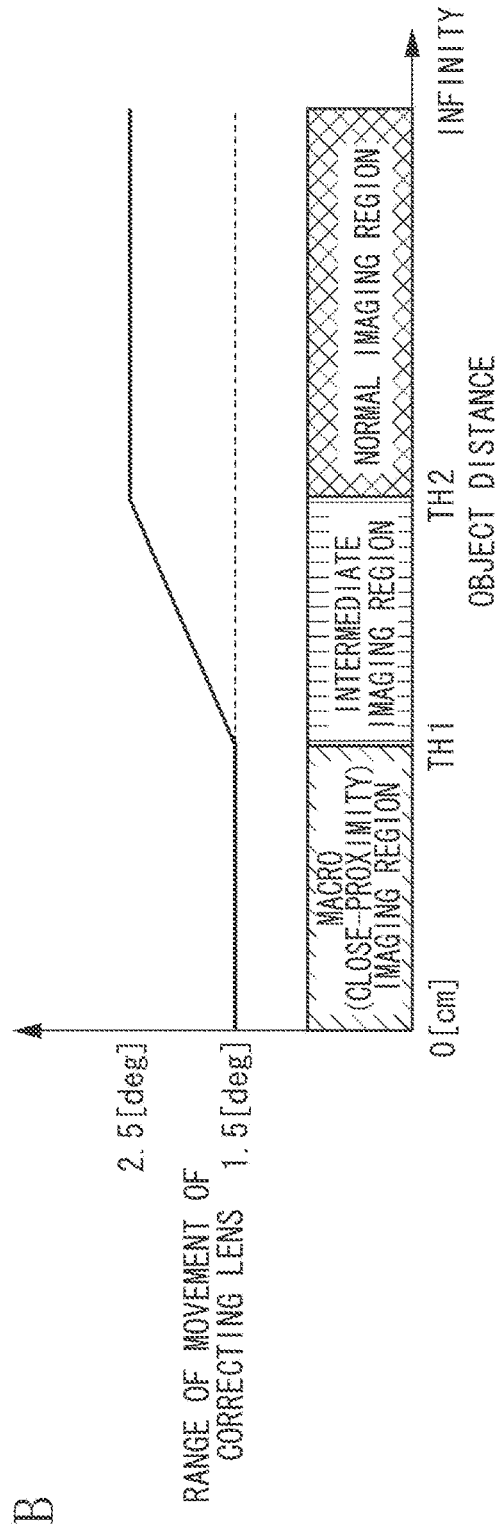

IMAGE CAPTURING APPARATUS FOR ADDRESSING IMAGE BLUR AND CONTROL METHOD FOR THE SAME

BACKGROUND OF THE INVENTION

Field of the Invention

The present invention relates to an image capturing apparatus, such as a digital still camera and a digital video camera, and to a control method for the same.

Description of the Related Art

Generally, an image capturing apparatus, such as a digital camera, detects a vibration of the image capturing apparatus itself and corrects image blur due to the vibration. More specifically, the image blur is corrected with an image blur correction apparatus driving a lens movable member (an image stabilizing lens and a holding member for the image stabilizing lens) that is movable in a manner so as to correct the image blur.

In many cases, the image blur correction apparatus uses an angular velocity meter and an accelerometer to detect the vibration. For example, various optical devices include an image stabilization apparatus that detects angular vibration with the angular velocity meter and moves a part of imaging lenses and an image sensor to reduce the image blur.

However, near distance imaging might involve a non-negligible amount of image deterioration due to what is known as parallel vibration. The parallel vibration acts in a horizontal or an orthogonal direction on a plane orthogonal to an optical axis of a camera and cannot be detected only with the angular velocity meter.

For example, when macro imaging with a distance of approximately 20 cm to an object is performed, the parallel vibration needs to be actively detected and correction for the vibration needs to be performed. The accelerometer is mainly used for detecting the parallel vibration.

The image blur correction apparatus obtains the amount and the direction of the vibration from acquired angular velocity information and acquired acceleration information, and outputs a correction position control signal for driving the lens movable member in a manner so as to cancel out the image blur. When the lens movable member is driven, a movable member position signal, indicating a current position of the lens movable member, is fed back to the image blur correction apparatus.

Then, the image blur correction apparatus outputs the correction position control signal corresponding to the movable member position signal, whereby feedback control is achieved.

Japanese Patent Application Laid-Open No. 2013-104921 proposes an image stabilization apparatus and an image capturing apparatus capable of achieving power saving by operating and stopping image blur correction in accordance with a focal length and an object distance (imaging magnification) while an object image is being displayed as a moving image on a liquid crystal display (LCD).

Digital cameras can display a moving image on a screen, such as an LCD. Even if there is an image blur which affects an object image to be recorded, such an image blur may not affect the object image displayed as a moving image. More specifically, the image blur may be unrecognized by a user.

In a case where the image blur correction is performed while the moving image is being displayed as described above, power is wastefully consumed for the image blur correction even for an image blur not affecting the moving image, in imaging performed on the wide angle side.

Thus, Japanese Patent Application Laid-Open No. 2013-104921 discusses the following control performed while a moving image, captured on the wide angle side having a small focal length, is being displayed. More specifically, whether the amount of displacement of the object image to be displayed, due to an image blur, exceeds a pixel pitch of the display screen is determined. In a case where the result indicates that the image blur of the object image to be displayed is unrecognizable or is relatively negligible by the user, an image blur correction mechanism is operated with a lower vibration suppression rate or is turned off.

When the image blur of the object image to be displayed is recognizable by the user, the image blur correction mechanism operates with a high vibration suppression rate. As described above, the angular vibration and the parallel vibration have a large effect on, for example, the macro imaging in which the object distance is small and the imaging magnification is large. Thus, the image blur correction mechanism operates with a high vibration suppression performance in accordance with the object distance even when image capturing is performed on the wide angle side.

Generally, in image data acquired by the image capturing apparatus, a marginal area including the four corners is likely to be darker than the center. Reduction of light amount in the marginal area relative to the center is known as shading. A larger reduction of the light amount in the marginal area (marginal illumination) relative to the center leads lower quality of image data.

The reduction in the marginal illumination is a characteristic derived from a lens that may be regarded as a cause of the difference in the brightness among the four corners. The reduction in the marginal illumination fluctuates in accordance with a zoom magnification, that is, a zoom lens position.

Further, when an image stabilization lens shifts from the optical axis, the marginal illumination is reduced at an area opposite to the direction of the movement. The marginal illumination is also reduced by an error in the attached position of the image sensor.

All these causes of the reduction in the marginal illumination have been required to be taken into consideration for determining the range of movement of the correcting lens to obtain an image, to be displayed or stored, unaffected by the shading.

The marginal illumination might also be reduced by a position of a focus lens for a focus adjustment, depending on a configuration of an optical lens group. For example, this might be the case where the configuration of the focus lens group employs an inner focus system. More specifically, the marginal illumination might be reduced by the reduction in the effective focal length due to the movement of the focus lens towards the front lens side for focusing of when the macro imaging in which the object distance is near distance is performed.

Thus, as discussed in Japanese Patent Application Laid-Open No. 2013-104921, the reduction in the marginal illumination involved in the macro imaging might be obvious depending on the configuration of the optical lens group, in a case where the range of movement of the correcting lens is determined for each zoom lens position.

When the range of movement of the correcting lens is fixed to that for the macro imaging, there is a problem in that the range of movement is too small to obtain a sufficient correction effect for a large vibration occurring during normal imaging, such as image capturing while walking.

The present invention is made in view of the problems described above, and is directed to providing an image stabilization effect while image quality is prevented from largely deteriorating due to shading.

SUMMARY OF THE INVENTION

According to an aspect of the present invention, an image capturing apparatus includes a calculation unit configured to calculate a correction amount for a vibration based on a vibration signal output from a vibration detection unit configured to detect the vibration, and a setting unit configured to set a range of movement of a correction unit configured to correct image blur based on the correction amount for the vibration, where the range of movement of the correction unit is set based on an object distance. The setting unit is configured to set the range of movement of the correction unit to be larger as the object distance increases.

Further features of the present invention will become apparent from the following description of exemplary embodiments with reference to the attached drawings.

BRIEF DESCRIPTION OF THE DRAWINGS

FIG. 4A and FIG. 4B are diagrams each illustrating a relationship between an object distance and a range of movement of the correcting lens according to the exemplary embodiment.

DESCRIPTION OF THE EMBODIMENTS

An exemplary embodiment of the present invention is described in detail below with reference to the attached drawings.

Figure 1:
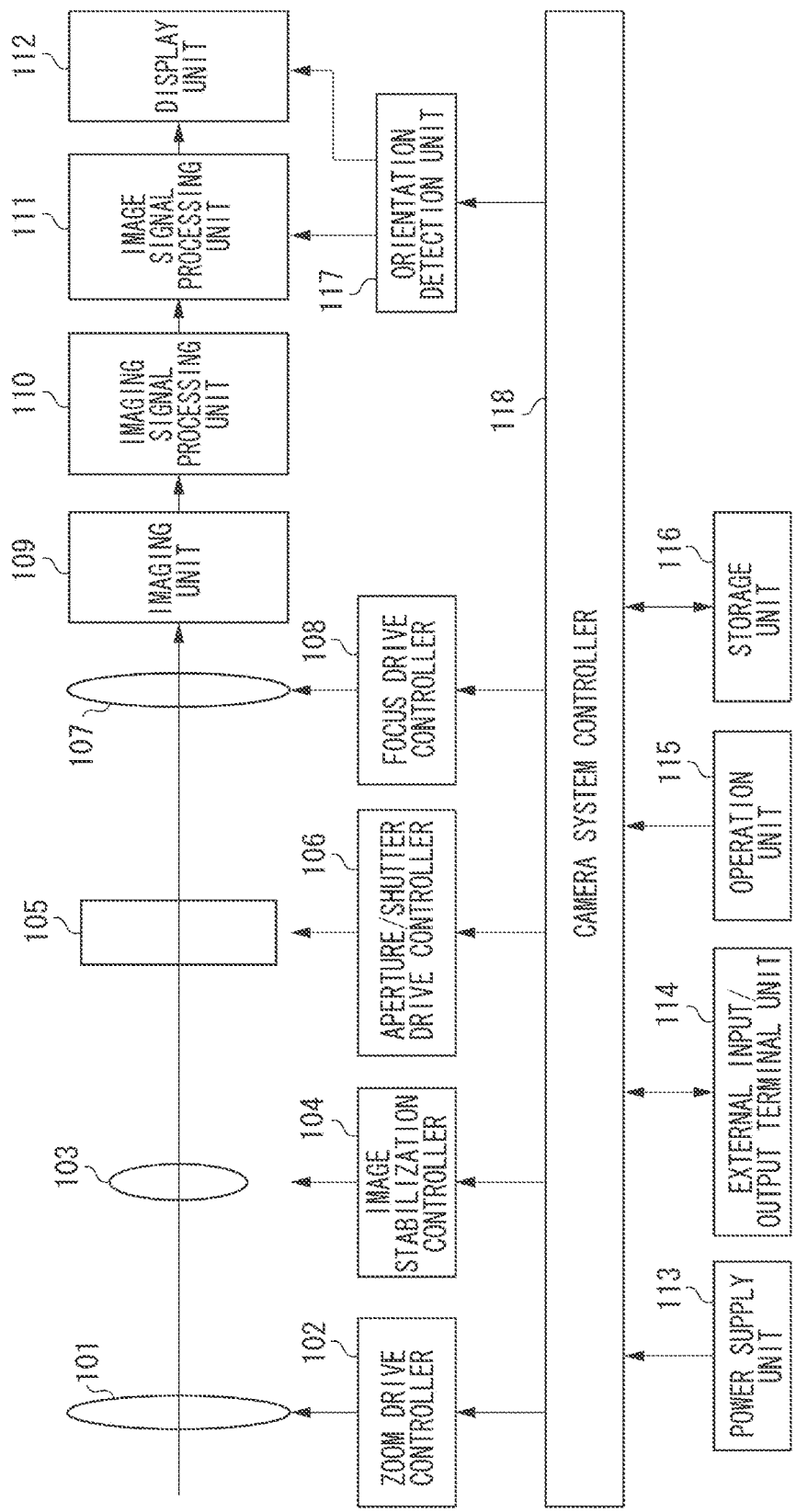
FIG. 1 is a block diagram of an image capturing apparatus according to an exemplary embodiment of the present invention.

FIG. 1 is a block diagram illustrating an example of a functional configuration of an image capturing apparatus according to an exemplary embodiment of the present invention. The image capturing apparatus according to the present exemplary embodiment is described as a digital still camera, but may have a movie-capturing function.

In FIG. 1, a zoom unit 101 is a part of imaging lenses forming an imaging optical system, and includes a zoom lens with which a lens magnification is changed. A zoom drive control unit 102 controls driving of the zoom unit 101 in accordance with control performed by a camera system controller 118.

A correcting lens 103 is movable in a direction orthogonal to an optical axis of an imaging lens. An image stabilization control unit 104 controls driving of the correcting lens 103. The image stabilization control unit 104 includes an angular velocity sensor that detects an angular vibration of the image capturing apparatus and an acceleration sensor that detects a parallel vibration in a plane orthogonal to the optical axis.

An aperture/shutter unit 105 is a mechanical shutter having an aperture function. An aperture/shutter drive control unit 106 drives the aperture/shutter unit 105 in accordance with control performed by the camera system controller 118. A focus lens 107 is a part of the imaging lenses, and can be displaced along the optical axis of the imaging lenses.

A focus drive control unit 108 drives the focus lens 107 in accordance with control performed by the camera system controller 118. The focus lens 107 according to the present exemplary embodiment has a configuration employing an inner focus system.

An imaging unit 109 converts an optical image, reaching the imaging unit 109 via the imaging lenses, into a pixel-based electrical signal using an image sensing element, such as a charged-coupled device (CCD) image sensor or a complementary metal-oxide-semiconductor (CMOS) image sensor. An imaging signal processing unit 110 converts the electrical signal output from the imaging unit 109 into an image signal, by executing analog-to-digital (A/D) conversion, correlated double sampling, gamma correction, white balance correction, color interpolation processing, or the like on the electrical signal.

An image signal processing unit 111 processes the image signal output from the imaging signal processing unit 110, depending on the intended use. More specifically, the image signal processing unit 111 generates an image for displaying or executes encoding processing or conversion to obtain a data file for recording.

A display unit 112 displays an image as needed, based on a displayed image signal output from the image signal processing unit 111. A power supply unit 113 supplies power to the entire image capturing apparatus, as needed. An external input/output terminal unit 114 inputs and outputs a communication signal and an image signal to and from an external device. A storage unit 116 stores various types data, such as image information.

An orientation detection unit 117 detects an orientation of the image capturing apparatus, and provides the orientation information to the image signal processing unit 111 and the display unit 112. Whether the image signal from the image signal processing unit 111 is in a portrait or a landscape orientation is determined based on the orientation information from the orientation detection unit 117, and thus a direction in which the image is displayed on the display unit 112 is determined.

The camera system controller 118 includes, for example, a central processing unit (CPU), a read only memory (ROM), and a random access memory (RAM). The CPU loads a control program stored in the ROM onto the RAM and executes the control program to control each unit of the image capturing apparatus, and thus implements operations performed by the image capturing apparatus including various operations described below.

An operation unit 115 includes a button and a switch with which a user issues an instruction to the image capturing apparatus, and includes a release button with which a first switch SW1 and a second switch SW2 are turned on in this order as a pressed amount increases. More specifically, the first switch SW1 and the second switch SW2 are respectively turned on when the release button is halfway pressed and fully pressed.

When the first switch SW1 is turned on, for example, the camera system controller 118 controls the focus drive control unit 108 so that auto-focusing is performed based on an auto focus (AF) evaluation value calculated based on an image signal, for displaying, to be output to the display unit 112 from the image signal processing unit 111.

The camera system controller 118 further executes automatic exposure (AE) processing of determining an aperture value and a shutter speed for obtaining an appropriate exposure amount based on brightness information on the image signal and a predetermined program line, for example.

When the second switch SW2 is turned on, the camera system controller 118 controls each unit in such a manner that an image is captured with the aperture value and the shutter speed thus determined, and image data obtained by the imaging unit 109 is stored in the storage unit 116.

While a through-the-lens image is being displayed with the release button not pressed, the camera system controller 118 predetermines the aperture value and the shutter speed for preparation of an exposure for still image capturing, based on the brightness information on the image signal and the program line, at a predetermined interval.

The operation unit 115 includes an image stabilization switch with which an image stabilization mode is selected. In a case where the image stabilization mode is selected using the image stabilization switch, the camera system controller 118 instructs the image stabilization control unit 104 to perform an image stabilization operation. As a result, the image stabilization control unit 104 that has received the instruction performs the image stabilization operation until an instruction to turn off the image stabilization is received.

The operation unit 115 includes an image capturing mode selection switch with which one of a still image capturing mode and a moving image capturing mode can be selected. Thus, image capturing is performed under an image capturing condition suitable for the image capturing mode thus selected.

The operation unit 115 further includes a play mode selection switch for selecting a play mode. The image stabilization operation is off while the play mode is on. The operation unit 115 further includes a magnification switch with which an instruction indicating a zoom magnification is issued.

Upon receiving the instruction indicating the zoom magnification issued by the magnification switch via the camera system controller 118, the zoom drive control unit 102 drives the zoom unit 101, whereby the zoom unit 101 moves to a zoom position corresponding to the instruction.

Figure 2:
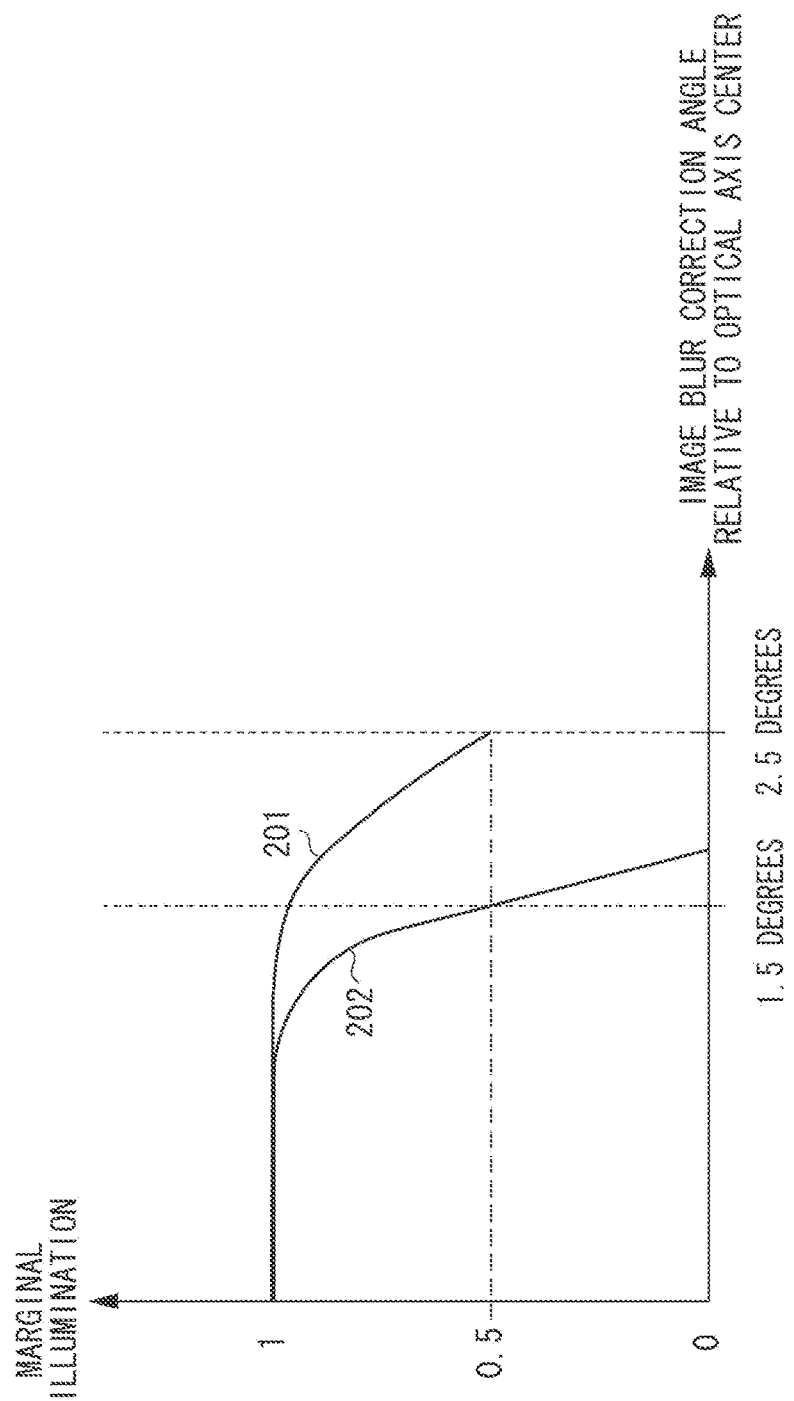
FIG. 2 is a diagram illustrating a marginal illumination with respect to an image blur correction angle of a correcting lens according to the exemplary embodiment.

Next, a position of the correcting lens 103, reduction in marginal illumination at an area positioned farthest from the optical axis, that is, at four corners, and a range of movement of the correcting lens 103 will be described in detail. FIG. 2 is a diagram illustrating a marginal illumination with respect to a correction angle of the correcting lens 103 relative to the optical axis center, in a state where the zoom lens is at the wide end.

Figure 3:
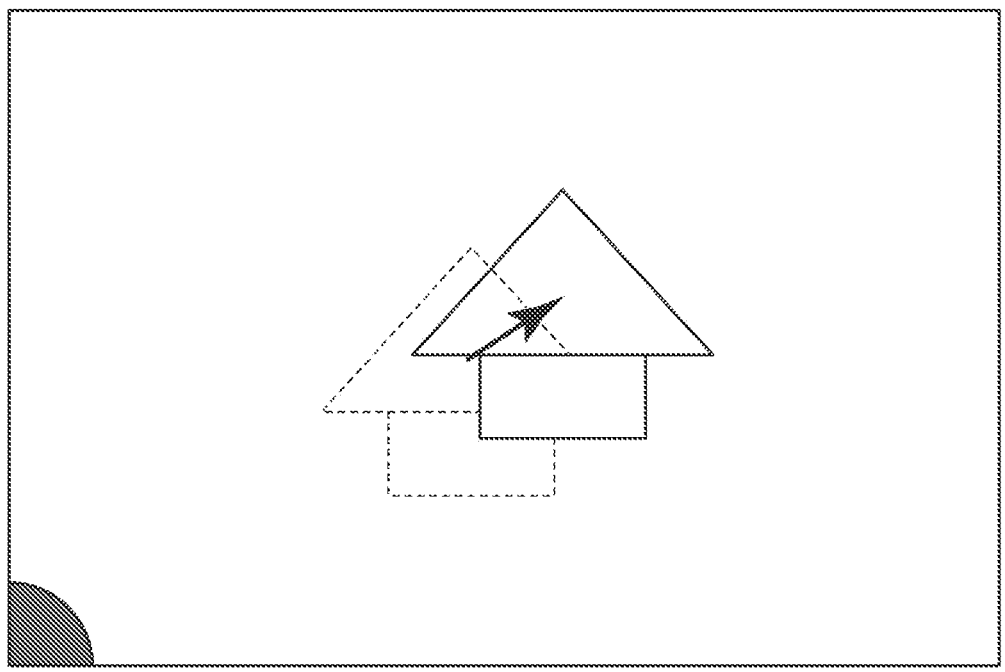
FIG. 3 is a diagram illustrating a relationship between a movement of the correcting lens according to the exemplary embodiment and a position where marginal illumination reduces.

Here, the marginal illumination at one of the four corners corresponding to a position on an opposite side of a direction in which an angle of view moves as illustrated in FIG. 3 when the correcting lens 103 moves.

As illustrated in FIG. 2, the marginal illumination, which is defined as 1 in a state where the correcting lens 103 is at the optical axis center, reduces as the position of the correcting lens 103 moves away from the optical axis center.

A shading state with the marginal illumination reduced by more than a predetermined reduction amount leads to an unacceptable image quality. Thus, the range of movement of the correcting lens 103 is determined to have a limit at which the marginal illumination is reduced to a predetermined value. In the present exemplary embodiment, the range of movement of the correcting lens 103 is set to have a limit at which the marginal illumination is reduced to 0.5.

A graph 201 represents a case where an object distance is within a range of a normal imaging region and a graph 202 represents a case where the object distance is within a range of a macro imaging region. A comparison between an illumination reduction rate of the graph 201 and an illumination reduction rate of the graph 202 of when the distance of the correcting lens 103 from the optical axis center is the same, indicates that the marginal illumination is reduced more in the case of the macro imaging region.

This is because when the focus lens, in a configuration employing an inner focus system, moves toward the front for the macro imaging, an effective focal length of the lens system as a whole becomes shorter whereby rays spreads more widely.

In an example of the present exemplary embodiment, the range of movement of the correcting lens 103 is 2.5 degrees for the normal imaging region and is 1.5 degrees for the macro imaging region, in a case where the marginal illumination reduction rate is 0.5 that is half of the marginal illumination reduction rate of when the correcting lens 103 is at the optical axis center.

Next, a relationship between the range of movement of the correcting lens 103 and the object distance in a case where the zoom lens is at the wide end is described with reference to FIGS. 4A and 4B.

A dotted line in FIG. 4A represents an example where the range of movement of the correcting lens 103 is not changed in accordance with the object distance information and is fixed to that for the object distance in the macro imaging region in which the shading effect is largest.

In the example represented by the dotted line, the range of movement is fixed at that for the macro imaging region where the marginal illumination is largely reduced. Thus, in a case where the object distance is within the range of the normal imaging region, an image stabilization effect is insufficient for a large camera vibration in image capturing, for example, while walking, due to the range of movement the correcting lens 103 set to be smaller than the actual allowable range of movement.

A solid line in FIG. 4A represents an example where the range of movement of the correcting lens 103 is changed in accordance with the object distance information while the effect of the shading is taken into account.

More specifically, the range of movement for the macro imaging region in which the object distances are equal to or smaller than a threshold TH1 (for example 50 cm) is set smaller than the range of movement for the normal imaging region in which the object distances are larger than the threshold TH1 (for example, the range of movement is 2.5 degrees for the normal imaging region and 1.5 degrees for the macro imaging region).

FIG. 4B illustrates an example where an intermediate imaging region is provided between the macro imaging region and the normal imaging region, and the range of movement for the intermediate imaging region is changed in accordance with the object distance.

More specifically, a threshold TH2 is set in addition to the threshold TH1 (TH1<TH2). The object distance that is equal to or smaller than the threshold TH1 is the macro imaging region. The object distance that is larger than the threshold TH1 and equal to or smaller than the threshold TH2 is the intermediate imaging region. The object distance that is larger than the threshold TH2 is the normal imaging region.

As illustrated with the solid line, the range of movement of the correcting lens 103 for the macro imaging region is set to be smaller than that for the normal imaging region. The range of movement of the correcting lens 103 for the intermediate imaging region gradually changes between that for the macro imaging region and that for the normal imaging region in accordance with the object distance. In FIG. 4B, linear interpolation processing is performed for the object distance.

By smoothly changing the range of movement of the correcting lens 103 for the intermediate imaging region, a sudden change in the range of movement can be prevented.

In the present exemplary embodiment, the description is mainly given for the case where the range of movement of the correcting lens 103 is changed when the zoom lens is at the wide end. However, this method using the intermediate imaging region is effective for a case where the range of movement of the correcting lens 103 is changed in accordance with the object distance of when the zoom lens is at a telescopic end side having a large focal length with which a change in the angle of view becomes easily noticeable.

The range of movement is smoothly changed using the intermediate imaging region in a case where the focal length is larger than a predetermined value (for example, 50 mm or more (35 mm equivalent focal length)). This is because, with this large focal length, the change in the angle of view becomes noticeable when the range of movement of the correcting lens 103, which is changed in accordance with the object distance, is suddenly changed.

In a case where the focal length is smaller than the predetermined value, the change in the angle of view does not become noticeable, and thus the range of movement of the correcting lens 103 may be changed at the predetermined object distance without the intermediate imaging region being used.

The change in the angle of view becomes less noticeable in a manner such that the size of the intermediate imaging region is changed in accordance with the focal length.

For example, the intermediate imaging region is set to be wider in a case where the focal length is larger than the predetermined value than in a case where the focal length is smaller than the predetermined value.

More specifically, in a case where the focal length is 100 mm (35 mm equivalent focal length), the intermediate imaging region is set for the object distance in a range between 5 cm and 20 cm. In a case where the focal length is 200 mm (35 mm equivalent focal length), the intermediate imaging region is set to be widened for the object distance in a range between 10 cm and 50 cm.

By thus widening the intermediate imaging region in a case where the focal length is large, a change rate of the range of movement of the correcting lens 103 becomes smaller with respect to the object distance, whereby the change in the angle of view becomes less noticeable when the range of movement is switched.

Alternatively, the intermediate imaging region may be increased as the focal length increases.

By thus changing the size of the intermediate imaging region in accordance with the focal length, an optimum setting in which a change in the angle of view, as a result of switching the range of movement of the correcting lens 103 is less noticeable can be achieved.

In a case where the range of movement of the correcting lens 103 is smoothly changed in accordance with the object distance using the intermediate imaging region, moving average processing may be executed on acquired object distance information whereby a sudden change of the range of movement of the correcting lens 103 is prevented even in a case where the object distance suddenly changes. Such a case is illustrated in FIG. 5A.

Figure 5A:
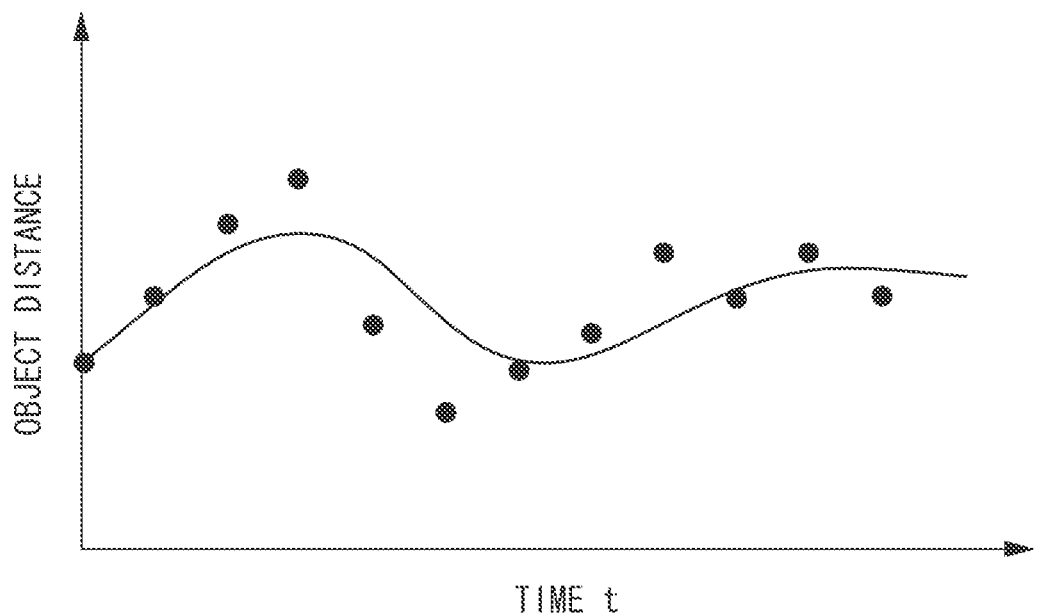
FIG. 5A and FIG. 5B are diagrams each illustrating a calculation of a moving average value of object distances according to the exemplary embodiment.

Black dots in the FIG. 5A each represent an obtained object distance, and a solid line represents moving average values of the object distances as a result of the moving average processing performed on information on the object distances.

A predetermined section (period) is determined and the transition of the object distances is smoothed by taking an average of the object distances as the period is shifted. Thus, an average value of the sequential data within the predetermined period is obtained. The moving average value according to the present exemplary embodiment is an average value obtained by averaging a plurality of object distances within a predetermined period.

The following formula represents the moving average processing:

$$DistAve[n] = \frac{1}{m}\sum_{i=0}^{m-1} Dist[n-i], \tag{1}$$

wherein Dist[n] represents an n-th object distance value, and DistAve[n] represents an n-th moving average value of the object value using m sampling values.

For example, the following formula represents the moving average processing on data of three points:

DistAve[$n$]=(Dist[$n$−2]+Dist[$n$−1]+Dist[$n$])÷3.

Figure 5B:
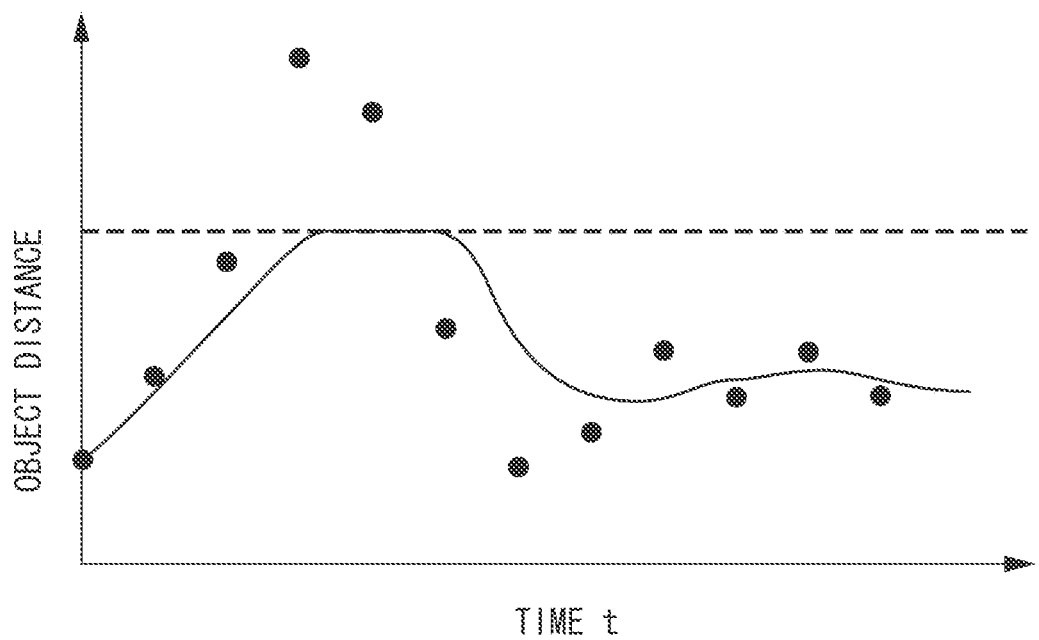

In a case where moving average processing is performed, an upper limit is set for the acquired object distances, as illustrated in FIG. 5B, whereby the range of movement of the correcting lens 103 can be smoothly changed and an excellent responsiveness to the near distance side (the macro imaging side) can also be achieved.

For example, a threshold TH3, represented by a dotted line in FIG. 5B, is set for the object distance (TH1<TH2<TH3). Thus, all the object distances equal to or larger than TH3 are set at the threshold TH3.

A feature of the present invention is to set the range of movement of the correcting lens 103 for the macro imaging side (near distance side). The object distance information on a side, in which the object distance is large and infinite, is not very important and is even undesirable information that largely affects the average value when the moving average processing is executed.

Thus, the object distances, acquired when the moving average processing is executed, are prevented from exceeding the threshold TH3, whereby the range of movement of the correcting lens 103 can be smoothly changed and the excellent responsiveness can also be achieved.

The range of movement of the correcting lens 103 is fixed for the macro imaging region in which the object distance is equal to or smaller than the threshold TH1. It is in order to respond to the delay occurring when the object distance is acquired by the moving average processing.

In particular, in a case where the delay in the narrowing of the range of movement of the correcting lens 103 occurs in the transition from the normal imaging region to the macro imaging region, reduction in the marginal illumination (vignetting) becomes visible.

Thus, in order to be free from the vignetting even in a case where the range of movement of the correcting lens 103 is set to be wider than the range of movement of the correcting lens 103 to the actual object distance due to the delay in the moving average processing, the range of movement of the correcting lens 103 for the macro imaging region is fixed and thus is not be changed in accordance with the object distance.

As described above, in the present exemplary embodiment, the threshold value and a table for setting the range of movement of the correcting lens 103 in accordance with the object distance, as illustrated in the solid lines in FIGS. 4A and 4B, are prepared for each of the zoom lens positions, and the range of movement of the correcting lens 103 is changed each time the zoom lens position and/or the object distance is changed.

The range of movement of the correcting lens 103 is thus set in accordance with the zoom lens position information and also the object distance information whereby the range of movement can be set while taking the effect of the shading into consideration.

Figure 6:
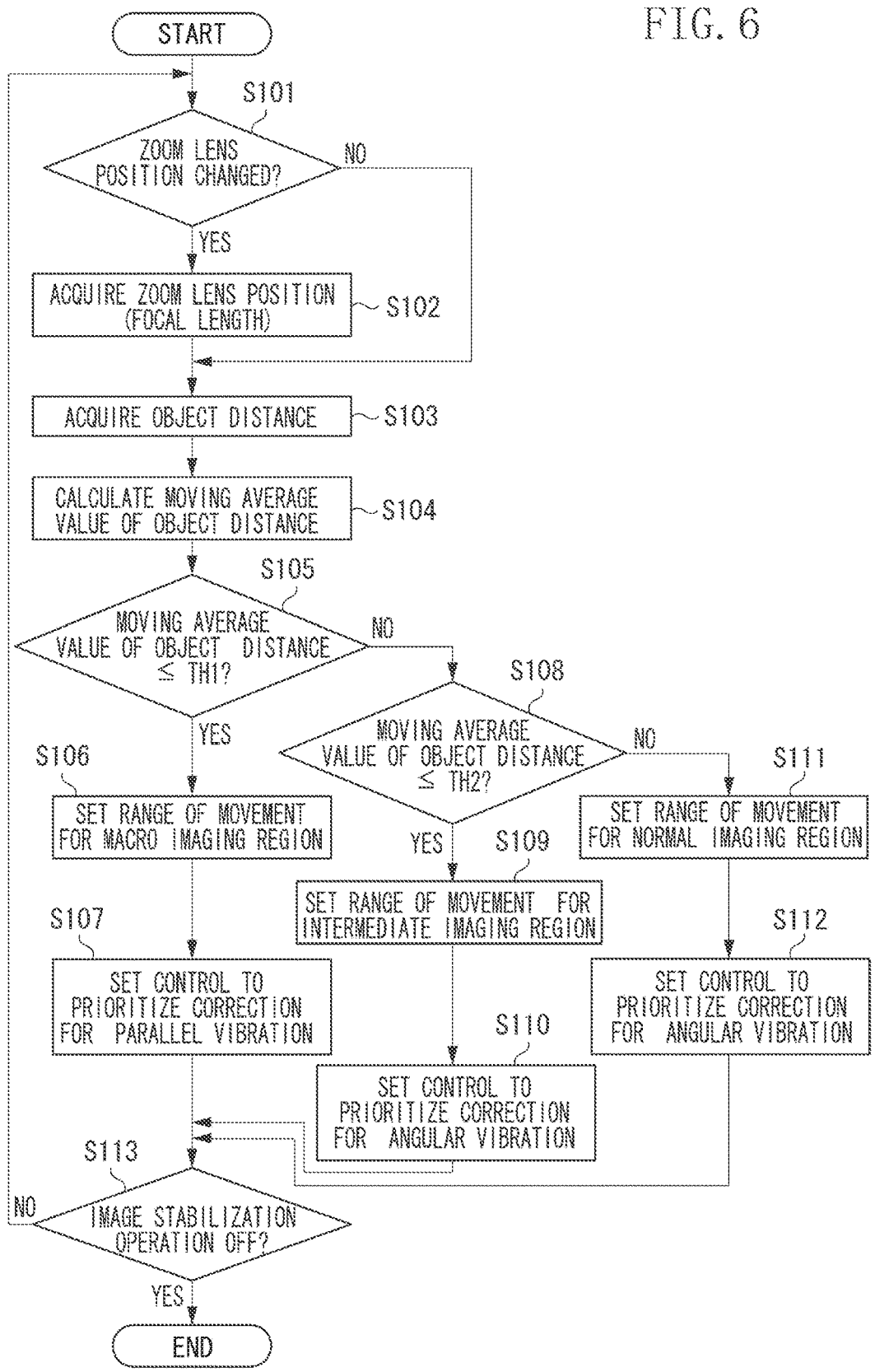
FIG. 6 is a flowchart illustrating a procedure for setting a range of movement of the correcting lens according to the exemplary embodiment.

Next, an example of changing the range of movement of the correcting lens 103 according to the present invention is described in detail. In this example, the range of movement of the correcting lens 103 in each of the zoom lens positions is changed in accordance with whether the object distance is in the macro imaging region, the normal imaging range, or the intermediate imaging region provided between the macro imaging region and the normal imaging region, as described above. FIG. 6 is a flowchart illustrating processing of setting the range of movement of the correcting lens 103.

When the image stabilization mode is selected with the operation unit 115 and the image stabilization operation is turned on, in step S101, whether the zoom lens position has been changed is checked.

In this processing, the zoom lens position information is compared with zoom position information currently stored. In a case where the zoom lens position has been changed (YES in step S101), the processing proceeds to step S102. In step S102, the zoom lens position is acquired and stored, and the processing proceeds to step S103.

Although focal length information can be acquired from the zoom lens position information, the focal length here is a value corresponding to a state in which an object distance is assumed as infinite. On the other hand, in a case where the zoom lens position has not been changed (NO in step S101), the zoom lens position information is not updated and the processing directly proceeds to step S103.

In step S103, object distance information is acquired. In step S104, the moving average value of the object distances is calculated through the moving average processing represented by Formula (1).

Imaging magnification information, which can be obtained from the zoom lens position information and the object distance information, may be used instead of the object distance information. Alternatively, focus lens position information of when the focus lens 107 is driven for focusing may be used for the determination.

In step S105, determination of whether the moving average value of the object distances is equal to or smaller than the threshold TH1 is performed. In a case where the moving average value of the object distances is determined to be equal to or smaller than the threshold TH1 (YES in step S105), the processing proceeds to step S106. In step S106, the range of movement of the correcting lens 103 is set for the macro imaging region.

For example, in a case where the zoom lens is on the wide end, the range of movement of the correcting lens 103 is set to 1.5 degrees. Then, in step S107, control is changed to the image stabilization control for prioritizing parallel vibration correction. The control for prioritizing the parallel vibration correction is for setting the rate of the correction amount for the parallel vibration to be larger than that for the angular vibration in a case where an amount of correction is limited when the sum of the correction amount for the angular vibration and the correction amount for the parallel vibration exceeds the range of movement of the correcting lens 103.

This is because the macro imaging is usually performed in a state where the camera is relatively tightly held and is less likely to involve a large angular vibration as in the case of the image capturing while walking. Thus, the correction is more actively performed for the parallel vibration that is likely to occur in the macro imaging, than for the angular vibration.

For example, when the correction amounts for the angular vibration and for the parallel vibration are both 1.0 degree, the sum of the correction amounts is 2.0 and thus is out of the range of movement of the correcting lens 103. When the macro imaging is performed under this condition, the correction amount for the angular vibration is set to 0.6 degrees and the correction amount for the parallel vibration is set to 0.9 degrees (ratio between the angular vibration correction amount and the parallel vibration correction amount set to 2:3).

When the sum of the correction amounts does not exceed 1.5 degrees, the image stabilization is performed without changing in the correction amounts for the angular vibration and for the parallel vibration.

On the other hand, in a case where it is determined that the moving average value of the object distances is larger than the threshold TH1 (NO in step S105), the processing proceeds to step S108. In step S108, determination of whether the moving average value of the object distances is equal to or smaller than the threshold TH2 is performed.

In a case where it is determined that the moving average value of the object distances is larger than the threshold TH2 (NO in step S108), the processing proceeds to step S111. In step S111, the range of movement of the correcting lens 103 for the normal imaging region is set as the range of movement of the correcting lens 103.

As an example, in a case where the zoom lens is at the wide side, the range of movement of the correcting lens 103 is set to be 2.5 degrees. Then, in step S112, the control is changed to the control for prioritizing the angular vibration correction. In the normal imaging region, a parallel vibration is small, and thus the correction amount is mainly used for the angular vibration.

In a case where the image capturing while walking or the like is performed and a large vibration occurs, and if the sum of the correction amounts for the parallel vibration and for the angular vibration exceeds the range of movement of the correcting lens 103, the correction amounts are limited while the ratio of the correction amounts are kept so that the sum of the correction amounts falls within the range of movement of the correcting lens 103.

In a case where the sum of the correction amounts does not exceeds the range of movement of the correcting lens 103, the correction amounts are used without being changed. On the other hand, in a case where the correction amount for the angular vibration is 3.0 degrees and the correction amount for the parallel vibration is 0.3, the sum of the correction amounts is 3.3 degrees. When the range of movement of the correcting lens 103 is 2.5 degrees, the correction amounts are limited with the ratio of 3.0:0.3 maintained between the correction amounts so that the correction amount for the angular vibration is set to 2.27 degrees and the correction amount for the angular vibration is set to 0.23, and the sum of the correction amounts is set to 2.5 degrees.

Alternatively, the correction amount for the angular vibration may be increased with the ratio of 3:2 set between the correction amounts for the angular vibration and for the parallel vibration.

On the other hand, in a case where it is determined that the moving average value of the object distances is equal to or smaller than the threshold TH2 in step S108 (YES in step S108), the moving average value of the object distances is larger than the threshold TH1 and equal to or smaller than TH2. Thus, the processing proceeds to step S109. In step S109, the range of movement of the correcting lens 103 for the intermediate imaging region is set as the range of movement of the correcting lens 103. The range of movement of the correcting lens 103 for the intermediate imaging region is set in accordance with the object distance. For example, in a case where the linear interpolation is performed in accordance with the object distance, the range of movement is obtained with the following Formula (2):

$$\text{range of movement} = ((\text{range of movement for normal imaging region} - \text{Range of movement for macro imaging region}) \times (\text{moving average value of object distance} - \text{threshold TH1}) \div (\text{threshold TH2} - \text{threshold TH1})) + \text{range of movement for macro imaging range} \quad (2).$$

Thus, the range of movement of the correcting lens 103 is 2.0 degrees when the thresholds TH1 and TH2 of the object distance are respectively 50 cm and 100 cm, a moving average value of the object distance is 75 cm, and the range of movement of the correcting lens 103 for the macro imaging region and the range of movement of the correcting lens 103 for the normal imaging region are 1.5 degrees and 2.5 degrees, respectively, as shown below:

$$((2.5 \text{ degrees} - 1.5 \text{ degrees}) \times (75 \text{ cm} - 50 \text{ cm}) \div (100 \text{ cm} - 50 \text{ cm})) + 1.5 \text{ degrees} = 2.0 \text{ degrees}.$$

In step S110, the correction for the angular vibration is prioritized, as in step S112.

Next, in step S113, determination of whether the image stabilization operation is turned off. In a case where the image stabilization operation is still on (NO in step S113), the processing returns to step S101, and the image stabilization continues. On the other hand, in a case where the image stabilization operation is off (YES in step S113), the image stabilization is terminated.

More specifically, the range of movement of the correcting lens 103 increases as the object distance increases, as long as the object distance is larger than the first threshold TH1 and is equal to or smaller than the second threshold TH2.

As described above, in the exemplary embodiment of present invention, the range of movement of the correcting lens 103 is changed in accordance with the zoom lens position and the object distance, so that the optimum range of movement of the correcting lens 103 corresponding to the shading characteristic of the optical system can be set. Furthermore, when the range of movement of the correcting lens 103 is changed in accordance with the object distance, a sudden change in the angle of view can be prevented. Thus, the image quality is prevented from largely degrading due to the shading while the image stabilization performance is maintained.

The optimum image blur correction can be more effectively achieved by changing the panning level relative to the amount of vibration in accordance with the range of movement of the correcting lens 103 and changing the vibration suppression rate adjusted by reducing an image correction gain, when the range of movement of the correcting lens 103 is changed in accordance with the object distance.

For example, if the image stabilization is performed without any adjustment when the range of movement of the correcting lens 103 is reduced, the correcting lens 103 is likely to reach the limit of the range of movement. Therefore, the image quality deteriorates by the sudden change in the angle of view because the movement of the correcting lens 103 hits the limitation.

Thus, in a case where the range of movement is reduced, for example, the panning level is increased and the correction gain is reduced for the vibration (lowering vibration suppression rate), so that the influence caused by the state where the movement of the correcting lens 103 hits the limitation is moderated whereby the image stabilization control over the entire process can be performed smoothly.

With the adjustment as described above, the optimum image blur correction can be more effectively achieved when the range of movement of the correcting lens is changed in accordance with the object distance.

The present invention is not limited to the preferred exemplary embodiment described above. For example, the present invention can be similarly applied to a case where image blur correction is performed by driving an image sensor in accordance with the amount of vibration, and to a case where image blur correction is electrically performed by changing an image segmenting position in accordance with the amount of vibration, and thus can be modified and changed in various ways without departing from the gist of the present invention.

An object of the present invention can be also achieved as follows. A storage medium, storing a program code of software in which a procedure for implementing a function of the embodiment described above is described, is supplied to a system or an apparatus. Then, a computer (or a CPU, a micro-processing unit (MPU), or the like) of the system or the apparatus reads out and executes the program code stored in the storage medium.

In such a case, the program code thus read out implements a novel function of the present invention, and the storage medium storing the program code and a program serve as a part of the present invention.

Examples of the storage medium used for supplying the program code include a flexible disk, a hard disk, an optical disk, a magneto-optical disk, and the like. Furthermore, a CD-ROM, a CD-R, a CD-RW, a DVD-ROM, a DVD-RAM, a DVD-RW, a DVD-R, a magnetic tape, a nonvolatile memory card, a ROM, and the like may be used.

With the computer that can execute the program code, the function of the embodiment described above is implemented. The present invention includes a case where the function of the embodiment described above is implemented with an operating system (OS), running on the computer, executing a part of or the entire actual processing based on an instruction in the program code.

The present invention further includes the following case. First, the program code, read out from the storage medium, is written to a memory of a function expansion board inserted in the computer or a function expansion unit connected to the computer. Then, a CPU and the like of the function expansion board or the function expansion unit executes a part of or the entire actual processing based on the instruction in the program code.

The present invention is not limited to an apparatus, such as a digital camera, mainly used for image capturing, and can be applied to any apparatuses, with an internal image capturing apparatus or connected to an external image capturing apparatus, including a mobile phone, a personal computer (a laptop computer, a desktop computer, a tablet computer, and the like), a game console, and the like. Thus, the term "image capturing apparatus" in this specification is intended to include any electronic apparatuses having an image capturing function.

The present invention can prevent image quality from being largely degraded due to shading while an image stabilization performance is maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046426, filed Mar. 9, 2015, which is hereby incorporated by reference herein in its entirety.

What is claimed is:

1. An image capturing apparatus comprising:
   a correcting lens, and
   at least one processor or circuit configured to perform the operations of the following units:
   a calculation unit configured to calculate a correction amount for a vibration based on a vibration signal output from a vibration detection unit configured to detect the vibration; and
   a setting unit configured to set a range of movement of the correcting lens, the correcting lens configured to be moved to correct image blur based on the correction amount for the vibration,
   wherein the range of movement of the correcting lens is set by the setting unit, based on an object distance, and the setting unit sets the range of movement to be larger as the object distance increases, and
   wherein the correcting lens is movable in a direction orthogonal to an optical axis of the image capturing apparatus.

2. The image capturing apparatus according to claim 1,
   wherein the setting unit is configured to set the range of movement of the correcting lens in such a manner that the range of movement linearly increases as the object distance increases in a range where an object distance is larger than a first threshold and is smaller than a second threshold, and
   wherein the setting unit is configured to fix, in a case where an object distance is equal to or smaller than the first threshold, the range of movement of the correcting lens to be a first range of movement, and is configured to fix, in a case where an object distance is equal to or larger than the second threshold, the range of movement of the correcting lens to be a second range of movement.

3. The image capturing apparatus according to claim 1,
   wherein in a case where a focal length is larger than a predetermined value, the setting unit is configured to set a linearly changing region in which the range of movement of the correcting lens increases as the object distance increases, in a range where the object distance is larger than a first threshold and smaller than a second threshold, and
   wherein in a case where the focal length is equal to or smaller than the predetermined value, the setting unit is configured not to set the linearly changing region.

4. The image capturing apparatus according to claim 1, wherein in a case where the range of movement of the correcting lens is set based on the object distance, an average value obtained by averaging a plurality of object distances within a predetermined period is used for the object distance.

5. The image capturing apparatus according to claim 4, wherein in a case where the plurality of object distances are averaged, a third threshold which is predetermined and larger than the second threshold value of the object distance is set as an upper limit for the object distance.

6. The image capturing apparatus according to claim 3, wherein in a case where the focal length is larger than the predetermined value, the setting unit is configured to set the linearly changing region to be longer than the linearly changing region in a case where the focal length is equal to or smaller than the predetermined value.

7. An image capturing method for an image capturing apparatus, the image capturing method comprising:
   calculating a correction amount for a vibration based on a vibration signal output from a vibration detector configured to detect the vibration, and
   setting a range of movement of a correcting lens, the correcting lens configured to be moved to correct image blur based on the correction amount for the vibration,
   wherein the range of movement of the correcting lens is set by the setting, based on an object distance, and the setting sets the range of movement to be larger as the object distance increases, and
   wherein the correcting lens is movable in a direction orthogonal to an optical axis of the image capturing apparatus.

8. The image capturing apparatus according to claim 2, wherein the first range of movement is smaller than the second range of movement.

* * * * *